United States Patent [19]
Notsu et al.

[11] Patent Number: 5,517,965
[45] Date of Patent: May 21, 1996

[54] GOVERNOR DEVICE FOR INTERNAL COMBUSTION ENGINE

[75] Inventors: Ikurou Notsu; Tatsuji Miyata; Hiroshi Matsuda; Yutaka Takada; Nobuo Hamasaki, all of Saitama, Japan

[73] Assignee: Nissan Diesel Motor Co., Ltd., Saitama, Japan

[21] Appl. No.: 281,202

[22] Filed: Jul. 27, 1994

[30] Foreign Application Priority Data

Sep. 20, 1993 [JP] Japan ................................. 5-233859
Sep. 28, 1993 [JP] Japan ................................. 5-241856
Sep. 28, 1993 [JP] Japan ................................. 5-241857

[51] Int. Cl.$^6$ .................................................. F02D 31/00
[52] U.S. Cl. ................................. 123/352; 364/426.04
[58] Field of Search ............................... 123/352, 585, 123/339, 355; 364/426.04

[56] References Cited

U.S. PATENT DOCUMENTS

| | | | |
|---|---|---|---|
| 4,700,679 | 10/1987 | Otobe et al. | 123/585 |
| 4,721,082 | 1/1988 | Hibino et al. | 123/339 |
| 4,879,655 | 11/1989 | Mori | 364/426.04 |
| 5,080,062 | 1/1992 | Strenzke | 123/352 |

FOREIGN PATENT DOCUMENTS 4-57564  8/1992  Japan .

*Primary Examiner*—Raymond A. Nelli
*Attorney, Agent, or Firm*—Lowe, Price, LeBlanc & Becker

[57] ABSTRACT

The present invention relates to a governor device for an internal combustion engine where a portion of the engine output is taken off as driving force for vehicle mounted accessory equipment which requires constant speed rotation with changes in load. By controlling the intake air quantity passing through a bypass passage which bypasses a mixing device for mixing fuel and intake air at a predetermined ratio, controlling a sub-throttle valve provided in an intake passage in series with a main throttle valve, and controlling a supply quantity of auxiliary gas fuel so that a detected air-fuel ratio is constant, the engine output is increase/decrease controlled in spite of changes in load in accessory equipment, to give constant engine rotational speed and good operability of an auxiliary power take-off device.

5 Claims, 16 Drawing Sheets

GOVERNOR DEVICE FOR INTERNAL COMBUSTION ENGINE

FIELD OF THE INVENTION

The present invention relates to a governor device for an internal combustion engine, and in particular to a governor device for an internal combustion engine where a portion of the engine output is taken off as driving force for vehicle mounted accessory equipment which requires approximate constant speed rotation with changes in load.

DESCRIPTION OF THE RELATED ART

Body and equipment for specific uses are often mounted on a truck chassis to thus give a specially equipped vehicle having specific functions. Such vehicles are generally provided with an auxiliary power take-off section for taking off a portion of the engine output to drive the body and equipment.

The auxiliary power take-off section for taking off engine power may be, for example, a power take-off device (referred to hereunder as a PTO) which is integral with the transmission, and which takes off power from a gear such as the transmission counter gear.

With a diesel engine, the fuel injection quantity is adjusted with a so-called governor, and the load characteristic with the accelerator can be controlled. Hence, when taking off engine power from a diesel engine with a PTO, it is possible to operate the PTO at constant speed irrespective of changes in load, thus giving good PTO operability and enabling specific functions to be sufficiently realized.

On the other hand, with vehicle Otto cycle engines wherein fuels such as gasoline are mixed with air and then burnt inside the engine cylinder, the fuel is injected based on the air quantity, and the resultant air-fuel mixture is ignited by an ignition device to thus drive the piston. With such an engine, it is common to use an engine output control method involving a throttle valve provided in the intake air passage and linked to an engine rotational speed control device such as an accelerator pedal, so that the engine output can be controlled by the opening of the throttle valve. Therefore, as discussed in Japanese utility model application No. 4-57564, the load characteristics can not be set optionally.

Consequently, when operating an Otto cycle engine which incorporates a PTO, the engine rotational speed will change even though the accelerator opening may be constant, due to the load conditions on the accessory equipment. When the engine rotational speed changes in this manner, stability and operability of the accessory equipment becomes poor, and there is also the possibility of the engine stalling.

To address this problem with an Otto cycle engine fitted with a PTO, one possible method of driving the PTO at constant speed in spite of changes in the load is to change the accelerator pedal opening to thus control the engine rotational speed. However, with such a method the control is complicated, so that PTO operability is not so good.

SUMMARY OF THE INVENTION

In view of the abovementioned problems, it is an object of the present invention to provide a governor device which can, even with a vehicle fitted with an Otto cycle engine, give a constant engine rotational speed in spite of changes in load on accessory equipment, in a similar manner to that with a conventional vehicle fitted with a diesel engine, to thus give good operability of the PTO.

To achieve the above objective, the present invention, as shown in FIG. 1 has a construction which includes a mixing device for mixing fuel and intake air in a predetermined ratio, an auxiliary power take-off device for taking off a portion of the engine output as driving force for vehicle mounted accessory equipment which requires constant speed rotation with changes in load, an intake mixture increase/decrease device for increasing/decreasing an intake mixture passing through an intake mixture passage, a target rotational speed setting device for setting a target rotational speed for the auxiliary power take-off device, and an intake mixture control device for controlling the intake mixture increase/decrease device so as to give the target rotational speed at the time of auxiliary power take-off. The governor device includes a main throttle valve which is linked to an accelerator pedal and is positioned in the intake mixture passage, and the intake mixture increase/decrease means includes a sub-throttle valve provided in the intake mixture passage in series with the main throttle valve. The intake mixture control means is a subthrottle valve control means for controlling the sub-throttle valve so as to give the target rotational speed.

With such a construction, when the target rotational speed for the auxiliary power take-off device is set by the target rotational speed setting device, the intake mixture increase/decrease device is controlled by the intake mixture control device so as to maintain the target rotational speed during auxiliary power take-off.

Here the intake mixture increase/decrease device increases/decreases the intake mixture passing through the intake mixture passage. However, due to the provision of the mixing device for mixing the fuel and intake air to a predetermined ratio, the intake mixture increase/decrease device increases/decreases the fuel and intake air with the air-fuel ratio maintained as it is. Therefore, the engine output can be increased/decreased.

Accordingly, even if the load on the auxiliary power take-off device changes, the engine rotational speed can be kept at the target rotational speed by increase/decrease of the engine output, thus giving good operability of the auxiliary power take-off device Furthermore, as shown in FIG. 2, the construction may be such that the intake mixture increase/decrease device comprises a bypass passage open/close device provided in a bypass passage which bypasses the before mentioned mixing device, for controlling the intake air quantity passing through the bypass passage, and the intake mixture control device may be a bypass passage control device for controlling the bypass passage open/close device so as to give the target rotational speed.

With such a construction, when the target rotational speed for the auxiliary power take-off device is set by the target rotational speed setting device, the bypass passage open/close device is controlled by the bypass passage control device so as to maintain the target rotational speed during auxiliary power take-off.

Here the bypass passage open/close device is provided in the bypass passage which bypasses the mixing device, and the intake mixture passing through the intake mixture passage is increase/decrease controlled by controlling the bypass passage open/close device. Since the mixing device mixes the fuel and intake air to a predetermined ratio, then when the intake air passing through the bypass passage is increased/decreased, the mixing device increases/decreases the fuel to maintain this ratio. The fuel and intake air can thus be increased/decreased to increase/decrease the engine output.

Accordingly, even with changes in load on the auxiliary power take-off device, the engine rotational speed can be kept at the target rotational speed by increase/decrease of the engine output, resulting in good operability of the auxiliary power take-off.

Moreover, a main throttle valve linked to an accelerator pedal may be positioned in the intake mixture passage, and the target rotational speed setting device may set the target rotational speed based on the opening of the main throttle valve. In this way, predetermined operating conditions can be set based on the opening of the main throttle valve.

Additionally, as shown in FIG. 3, a main throttle valve linked to an accelerator pedal may be positioned in the intake mixture passage, and the intake mixture increase/decrease device may comprise a sub-throttle valve provided in the intake mixture passage in series with the main throttle valve, and the intake mixture control device may be a sub-throttle valve control device for controlling the sub-throttle valve so as to give the target rotational speed.

With such a construction, when the target rotational speed for the auxiliary power take-off device is set by the target rotational speed setting device, the sub-throttle valve is controlled by the sub-throttle valve control device so as to maintain the target rotational speed at the time of auxiliary power take-off.

Here the sub-throttle valve is provided in series with the main throttle valve linked to the accelerator pedal, and the intake mixture passing through the intake mixture passage is increase/decrease controlled by controlling the sub-throttle valve. Since the mixing device mixes the fuel and intake air to a predetermined ratio, then when the intake mixture passing through the intake mixture passage is increased/decreased, the mixing device increases/decreases the fuel to maintain this ratio. The fuel and intake air can thus be increased/decreased to increase/decrease the engine output.

Accordingly, even with changes in load on the auxiliary power take-off device, the engine rotational speed will not deviate greatly from the target rotational speed. The target rotational speed is thus maintained resulting in good operability of the auxiliary power take-off.

The internal combustion engine may be one which uses high pressure natural gas fuel. In this case, the gas fuel and intake air may be mixed to a predetermined ratio and then supplied to the engine.

Moreover, the construction may comprise an auxiliary gas fuel supply device for supplying auxiliary gas fuel, an air-fuel ratio detection device for detecting the air-fuel ratio of the engine intake mixture, and a device for controlling the supply quantity of auxiliary gas fuel so that the detected air-fuel ratio during auxiliary power take-off is constant.

Furthermore, as shown in FIG. 4, the construction may comprise a mixing device for mixing natural gas and air in a predetermined ratio, an auxiliary power take-off device for taking off a portion of the engine output as driving force for vehicle mounted accessory equipment which requires constant speed rotation with changes in load, an intake mixture increase/decrease device for increasing/decreasing the intake mixture passing through the intake mixture passage, a target rotational speed setting device for setting a target rotational speed for the auxiliary power take-off device, an auxiliary gas fuel supply device for supplying auxiliary gas fuel, an air-fuel ratio detection device for detecting the air-fuel ratio of the engine intake mixture, and an auxiliary gas fuel intake mixture control device for controlling the supply quantity of auxiliary gas fuel so that the detected air-fuel ratio during auxiliary power take-off is constant, and for controlling the intake mixture increase/decrease device so as to give the target rotational speed.

With such a construction, when the target rotational speed for the auxiliary power take-off device is set by the target rotational speed setting device, the auxiliary gas fuel intake mixture control device controls the supply quantity of auxiliary gas fuel to keep the detected air-fuel ratio constant and controls the intake mixture increase/decrease device to give the target rotational speed, thus maintaining the target rotational speed during auxiliary power take-off.

Here the intake mixture increase/decrease device increases/decreases the intake mixture passing through the intake mixture passage. However, due to the provision of the mixing device for mixing the fuel and intake air at a predetermined ratio, the intake mixture increase/decrease device increases/decreases the fuel and intake air with the air-fuel ratio maintained as it is. Moreover, with the auxiliary supply of the gas fuel by the auxiliary gas fuel supply device, since the detected air-fuel ratio will become a predetermined fixed value richer than normal, the engine output can be increased.

That is to say, when at the time of auxiliary power take-off the engine rotational speed is for example lower than the target rotational speed due to a load change of the accessory equipment, the intake mixture increase/decrease device is controlled by the auxiliary gas fuel intake mixture control device so that the intake mixture passing through the intake mixture passage is increased. At the same time, the auxiliary gas fuel is supplied so that the air-fuel ratio becomes a set rich fixed air-fuel ratio. As a result, the engine output increases and rotational speed increases up to the target rotational speed.

On the other hand, when the rotational speed is higher than the target rotational speed, the intake mixture increase/decrease device reduces the intake mixture passing through the intake mixture passage, with the air-fuel ratio kept at a set air-fuel ratio, so that the engine output is decreased and the rotational speed drops to the target rotational speed.

In this way, during auxiliary power take-off the engine intake air quantity and fuel supply quantity are for example increased so that even if the load on the auxiliary power take-off device changes, the engine rotational speed does not deviate greatly from the target rotational speed. Therefore, the target rotational speed is maintained giving good operability of the auxiliary power take-off device.

Moreover, as shown in FIG. 4, the intake mixture increase/decrease device may comprise a bypass passage open/close device provided in the bypass passage which bypasses the mixing device, for controlling the intake air quantity passing through the bypass passage, and the auxiliary gas fuel intake mixture control device may comprise a bypass passage control device for controlling the bypass passage open/close device so as to give the target rotational speed during auxiliary power take-off.

With such a construction, when the target rotational speed for the auxiliary power take-off device is set by the target rotational speed setting device, the bypass passage open/close device provided in the bypass passage is controlled by the bypass passage control device so as to maintain the target rotational speed during auxiliary power take-off, while at the same time, the auxiliary fuel supply quantity is feedback controlled to keep the air-fuel ratio at the set air-fuel ratio.

Here when at the time of auxiliary power take-off, the engine rotational speed is for example lower than the target rotational speed due to a load change of the accessory equipment, the bypass passage is increasingly opened by the auxiliary gas fuel intake mixture control device so that the bypass intake air quantity increases, while at the same time, the auxiliary fuel supply quantity is feedback controlled to keep the air-fuel ratio at the set air-fuel ratio. As a result, the engine output increases and the rotational speed increases up to the target rotational speed. On the other hand, when the rotational speed is higher than the target rotational speed, the bypass passage is reducingly closed to reduce bypass air quantity, with the air-fuel ratio kept at the set air-fuel ratio, so that the engine output is decreased and the rotational speed drops to the target rotational speed.

Moreover, the construction may comprise an auxiliary gas fuel supply device for supplying auxiliary gas fuel, and a device for controlling the supply quantity of auxiliary gas fuel so as to give the target rotational speed during auxiliary power take-off.

In addition, as shown in FIG. 5, the construction may comprise a mixing device for mixing natural gas and intake air in a predetermined ratio, an auxiliary power take-off device for taking off a portion of the engine output as driving force for vehicle mounted accessory equipment which requires constant speed rotation with changes in load, a target rotational speed setting device for setting a target rotational speed for the auxiliary power take-off device, an auxiliary gas fuel supply device for supplying auxiliary gas fuel, and an auxiliary gas fuel control device for controlling the supply quantity of auxiliary gas fuel so as to give the target rotational speed during auxiliary power take-off.

With such a construction, when at the time of auxiliary power take-off the engine rotational speed detected by an engine rotational speed detector is for example lower than the target rotational speed due to a load change of the accessory equipment, the auxiliary gas fuel supply amount is increased by the auxiliary gas fuel control device. As a result, the air-fuel ratio becomes richer than for example the lean predetermined ratio set by the mixing device, so that the engine output is increased and the rotational speed increases up to the target rotational speed. On the other hand, when the rotational speed is higher than the target rotational speed, the auxiliary gas fuel supply quantity is decreased. As a result, the air-fuel ratio becomes even leaner than for example the lean predetermined ratio set by the mixing device, so that the engine output is decreased and the rotational speed drops to the target rotational speed.

In this way, during auxiliary power take-off the fuel supply quantity is for example increased so that even if the load on the auxiliary power take-off device changes, the engine rotational speed does not deviate greatly from the target rotational speed. Therefore, the target rotational speed is maintained giving good operability of the auxiliary power take-off device.

DETAILED DESCRIPTION OF THE PREFERRED EMBODIMENTS

As follows is a description of the embodiments according to the present invention with reference to the drawings.

Figure 1:
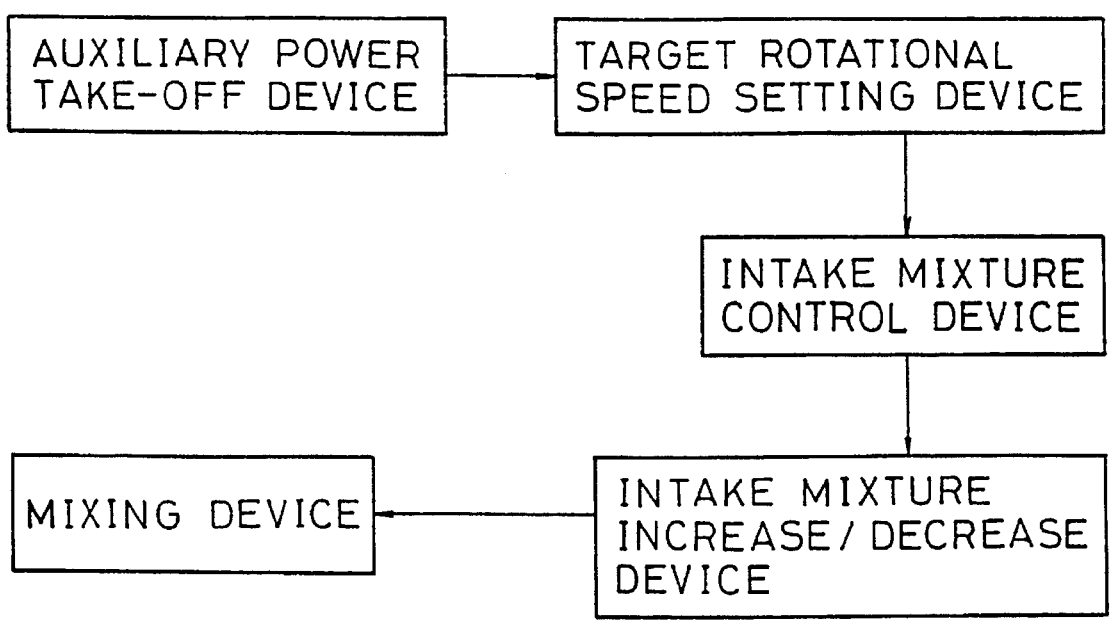
FIG. 1 is a block diagram illustrating a first basic structure of the present invention.
Figure 2:
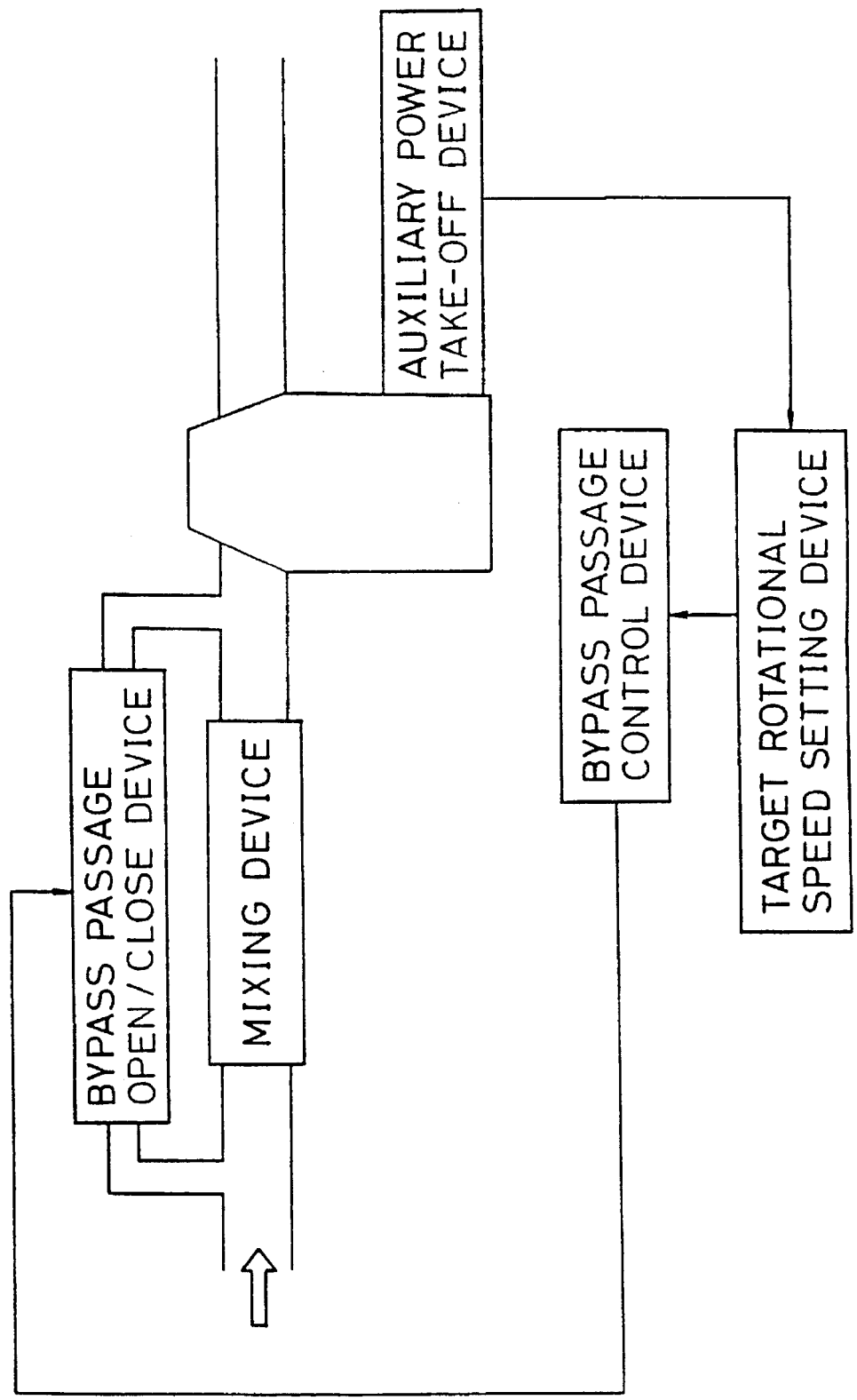
FIG. 2 is a block diagram illustrating a second basic structure of the present invention.
Figure 3:
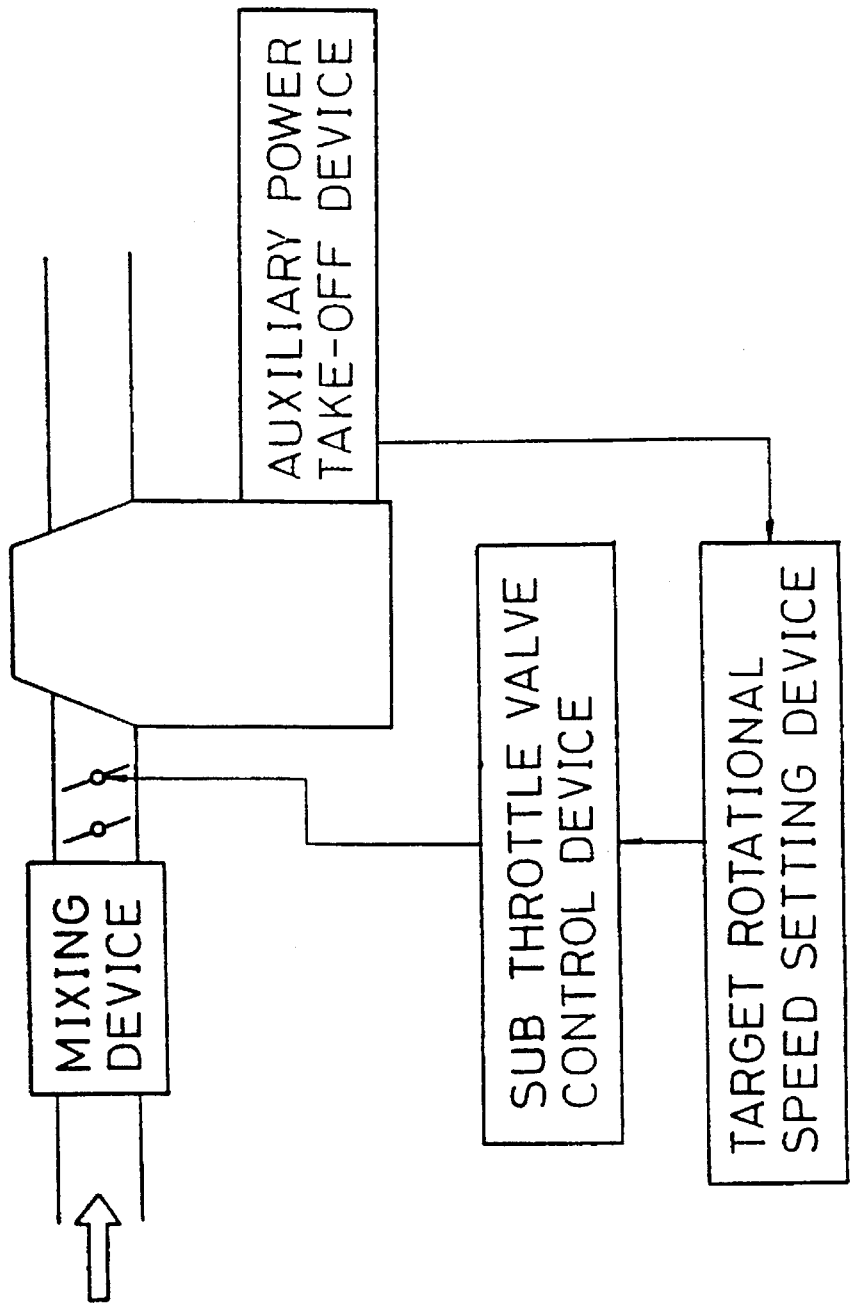
FIG. 3 is a block diagram illustrating a third basic structure of the present invention.
Figure 4:
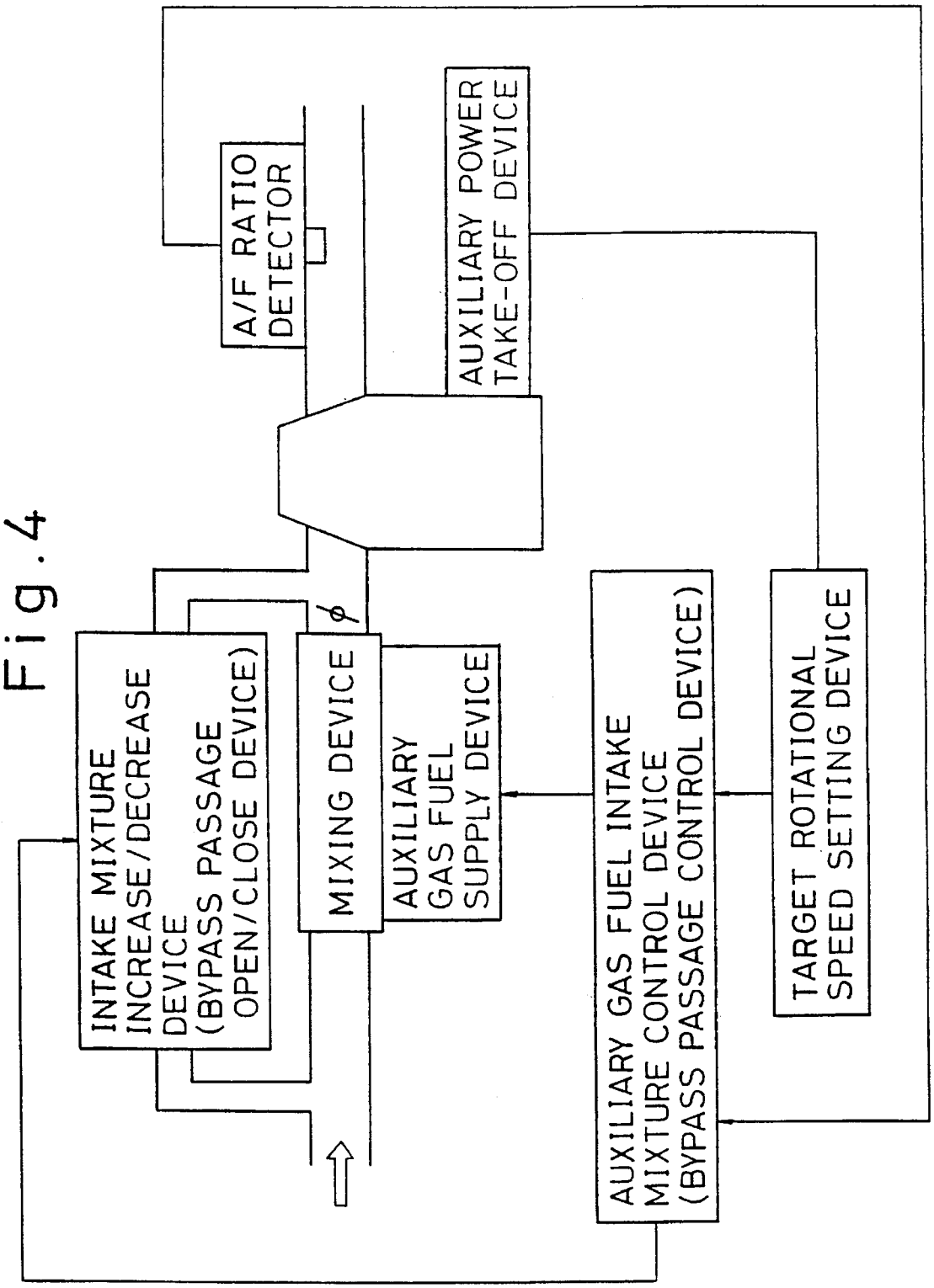
FIG. 4 is a block diagram illustrating a fourth basic structure of the present invention.
Figure 5:
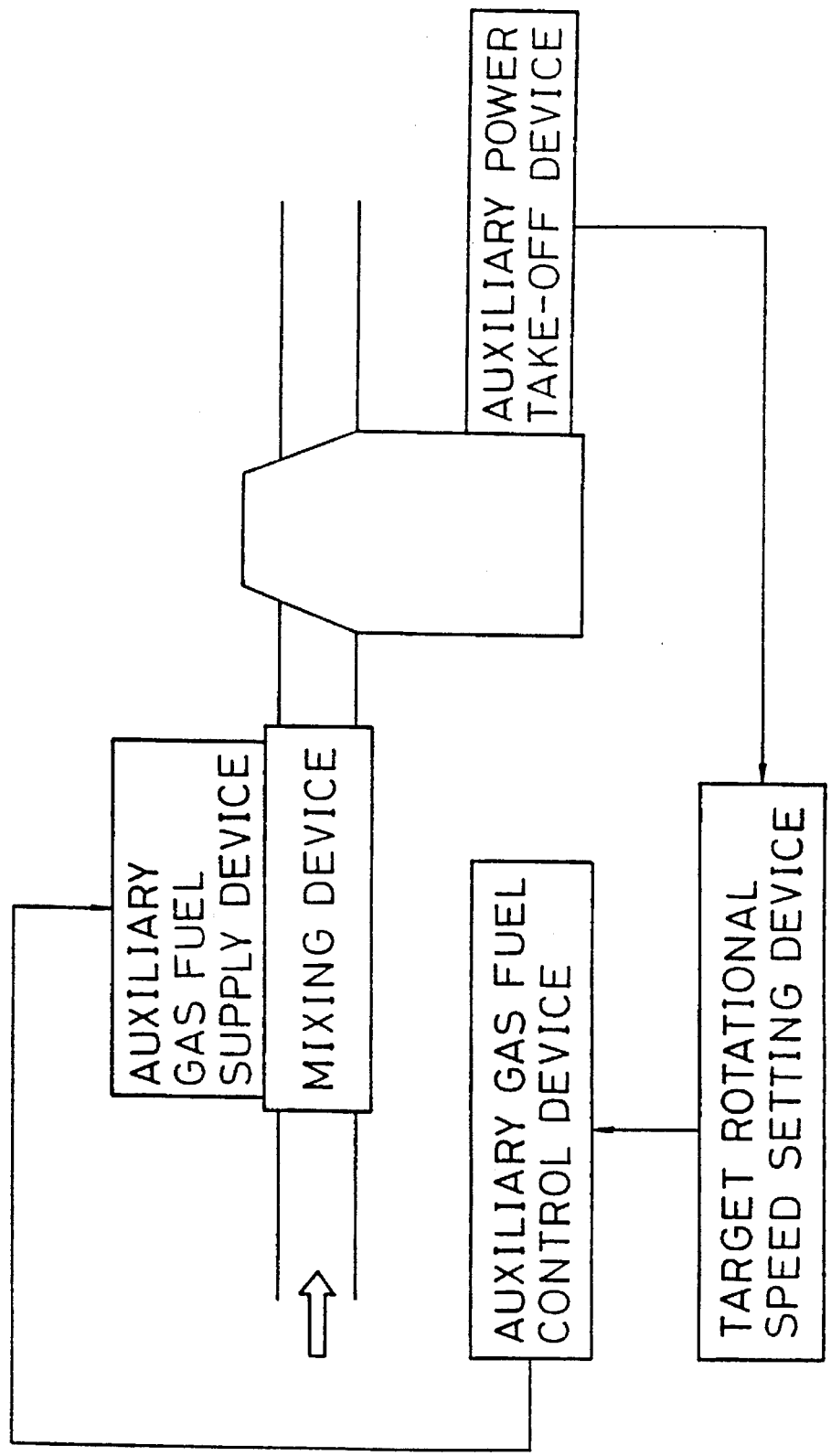
FIG. 5 is a block diagram illustrating a fifth basic structure of the present invention.
Figure 6:
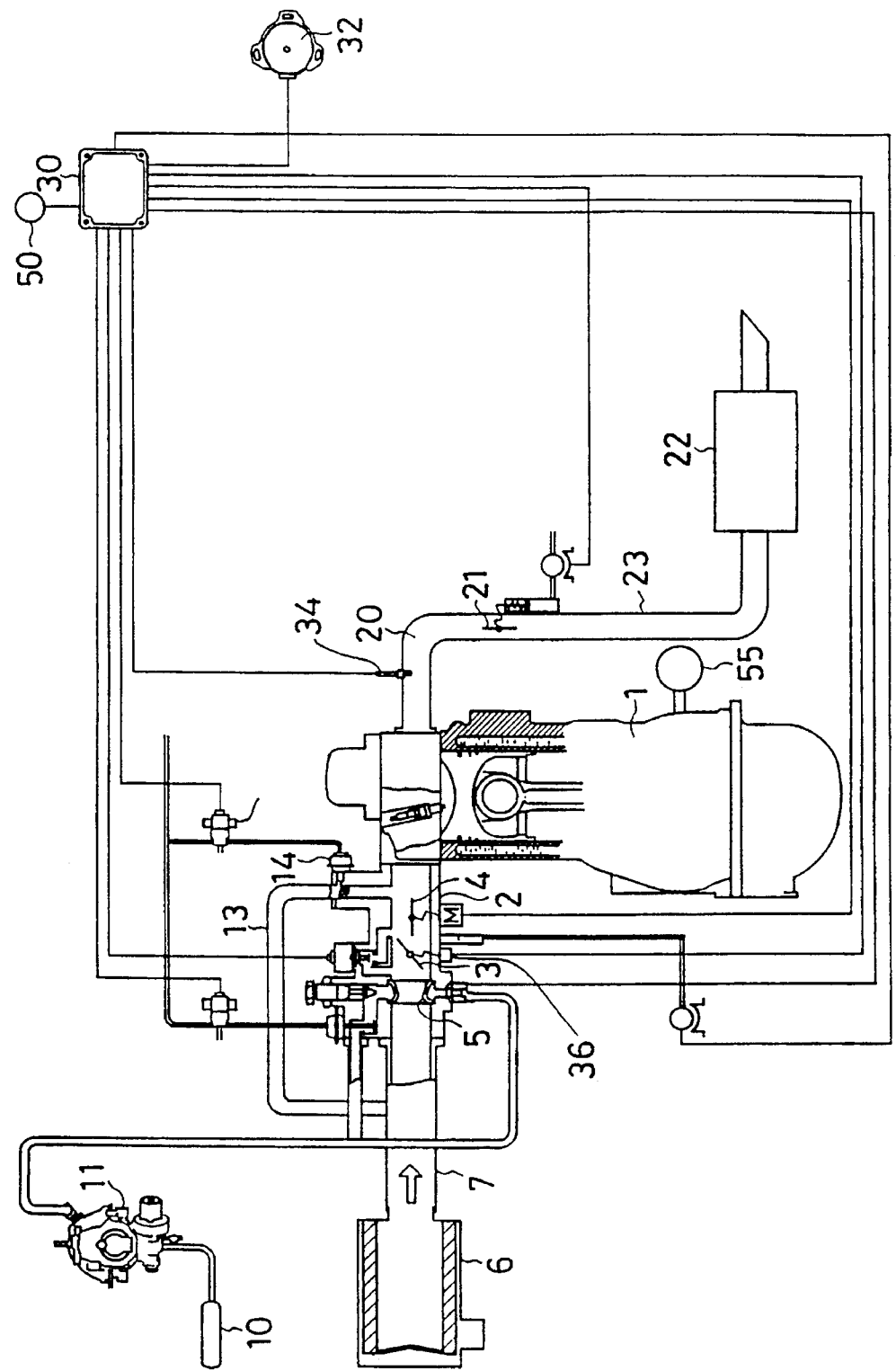
FIG. 6 is a schematic diagram of a system structure of the embodiments of the present invention.

Referring now to a first embodiment of the present invention, there is shown in FIG. 6 a natural gas (referred to hereunder as CNG) fuel engine 1 is fitted with an intake manifold 2 connected to an intake pipe 7 having an air duct 6, with a main throttle valve 3 linked to an accelerator pedal (not shown in the figure), a sub-throttle valve 4, and a mixer 5 disposed therebetween.

The mixer 5 mixes air with CNG supplied by way of a pressure reducing valve 11 from a CNG tank 10.

Figure 7:
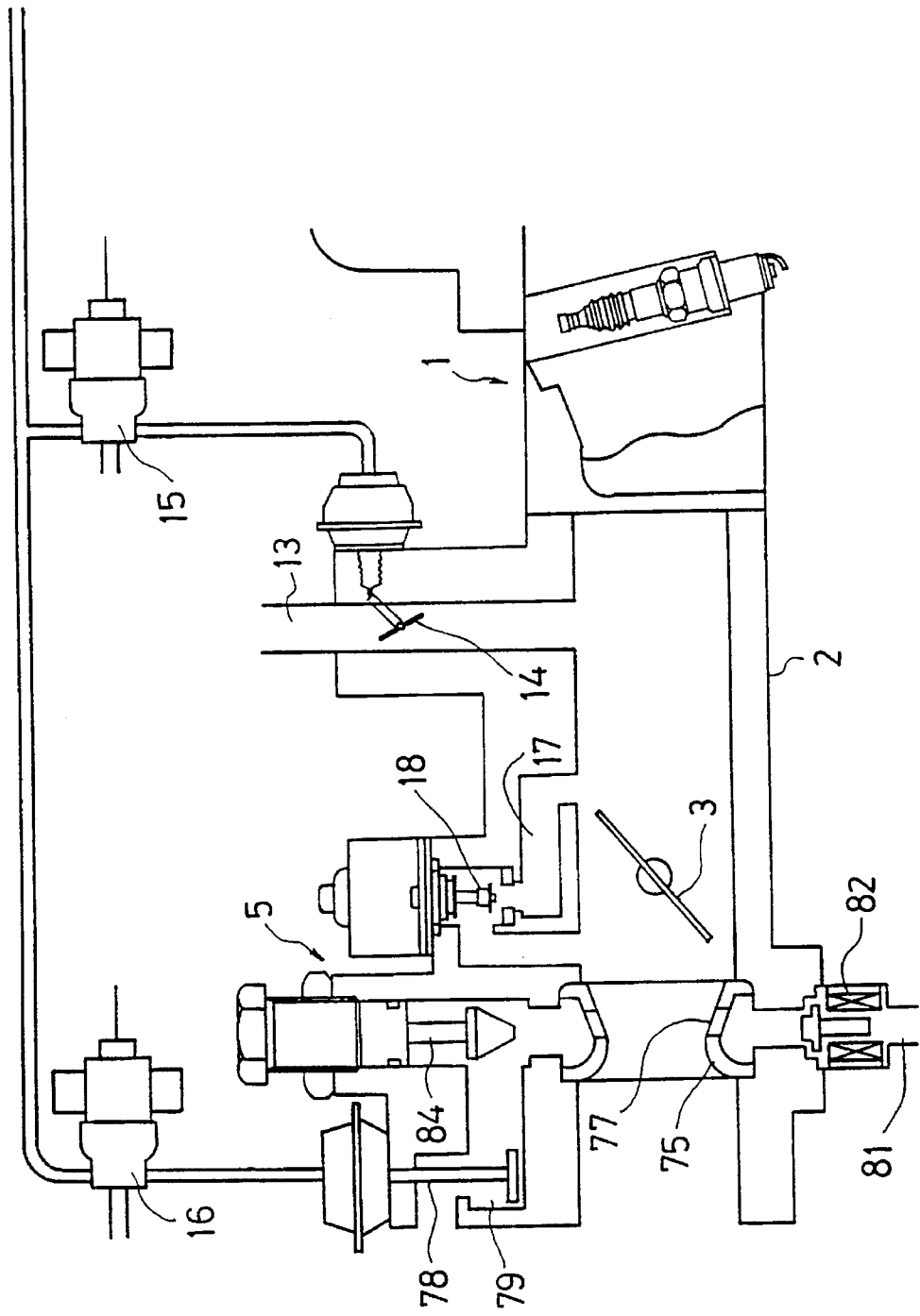
FIG. 7 is a schematic diagram of the essential parts of the embodiments of the present invention.

As shown in FIG. 7, the mixer 5 introduces gas fuel which has been pressure reduced with the pressure reducing valve 11, to a venturi 75 provided upstream of the main throttle valve 3 linked to the accelerator pedal (not shown in this figure). The fuel is drawn in from a slit 77 opening into the venturi 75, in correspondence with the intake air quantity, so that the intake air and fuel are mixed to give a fixed lean air-fuel ratio. That is to say, the mixer 5 functions as a mixing device for mixing the fuel and intake air in a predetermined ratio. Also provided is a shut off valve 78 which shuts off a fuel flow path 79 when the engine is decelerated, and an adjustment screw 84 for adjustment of the initial opening of the fuel flow path.

A bypass passage 13 in which is disposed a bypass control valve 14 for controlling the intake mixture quantity passing therethrough is provided for bypassing the mixer 5 and the main throttle valve 3. The bypass control valve is a diaphragm type valve. The opening of the bypass control valve 14 is increased/decreased by controlling a supply air pressure thereto with a solenoid valve 15. The shut off valve 78 is also a diaphragm type valve, is opened and closed by controlling the supply air pressure thereto with a solenoid valve 16.

The bypass control valve 14 and the solenoid valve 15 thus make up bypass passage open/close device.

Additionally there is an exhaust pipe 23 having an exhaust shutter 21 and a muffler 22, connected to an exhaust manifold 20.

Moreover, an idling control passage 17 which is connected between upstream and downstream of the main throttle valve 3 is fitted with an idle control valve 18. The idle speed can thus be controlled by opening the idle control valve 18 so that a mixture flows therethrough bypassing the main throttle valve 3.

The various devices for the engine 1 such as the solenoid valve 15 which controls the bypass air quantity, are controlled by a control unit 30 to suit to the various operating conditions.

To achieve this, detection signals from various sensors are input to the control unit 30. Such sensors comprise a crank angle sensor 32 (engine rotational speed detection device) provided for example on the engine cam shaft for detecting engine rotational speed, an exhaust sensor 34 (air-fuel ratio detection device) provided in the exhaust manifold 20 for detecting the air-fuel ratio of the engine intake mixture by measuring the oxygen concentration in the exhaust gas, and an opening sensor 36 for detecting the opening value θ of the main throttle valve 3. An engine rotational speed signal N, air-fuel ratio signal λ, and main throttle valve 3 opening value θ are input from these sensors to the control unit 30.

Moreover, a PTO 55 (auxiliary power take-off device) is connected to the engine 1 for taking off a portion of the engine output as driving force for vehicle mounted accessory equipment (not shown in the figure) which requires constant speed rotation with changes in load, while a governor switch 50 for switching on the governor device at the time of operation of the PTO 55 is connected to the control unit 30.

Figure 8:
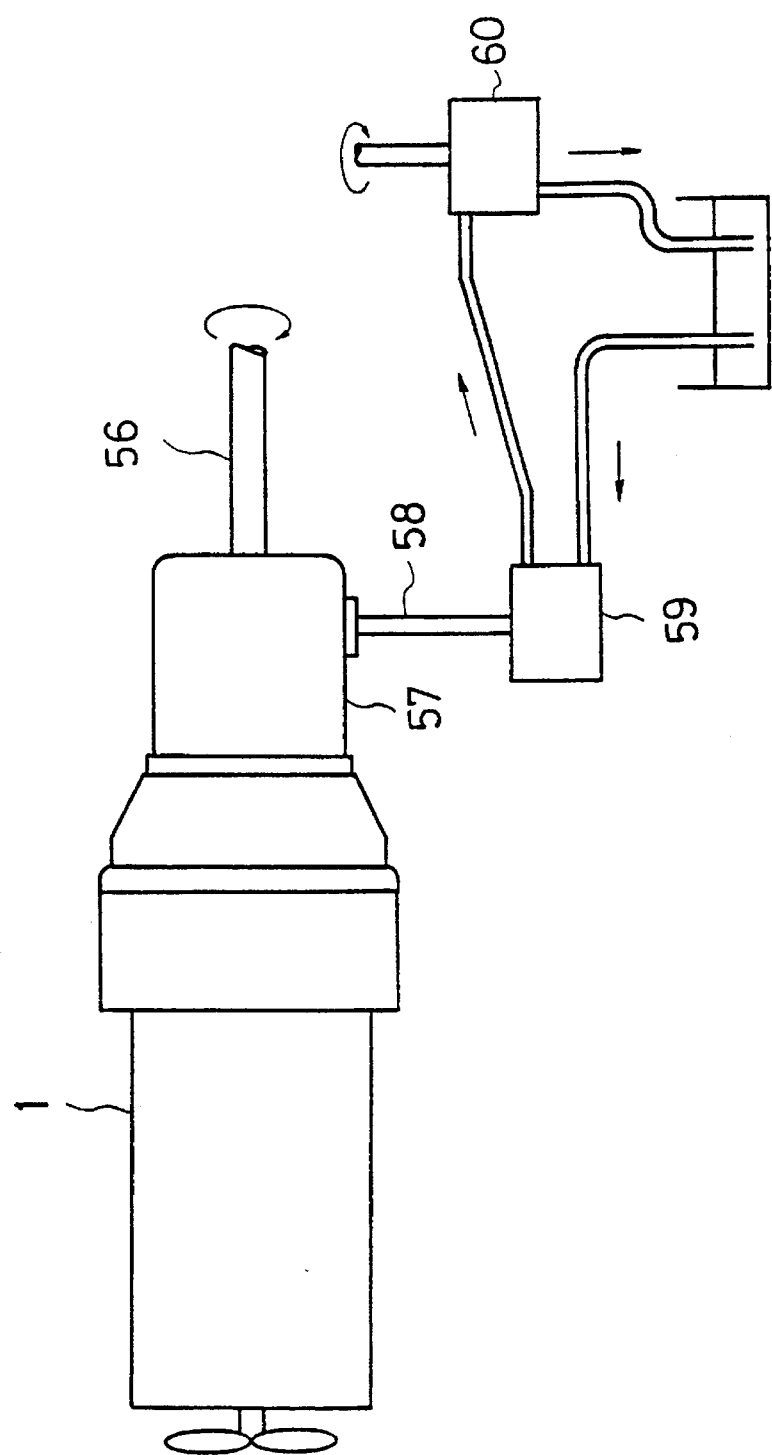
FIG. 8 is a schematic structural diagram of a PTO according to the embodiments of the present invention.

As follows is a brief description related to the PTO 55 with reference to FIG. 8.

With the engine 1, as well as an output shaft 56 therefrom for driving a vehicle, there is provided an auxiliary output shaft 58 from an auxiliary power take-off section 57 for driving a hydraulic pump 59. Hydraulic pressure from the hydraulic pump 59 drives a hydraulic motor 60 to thereby drive accessory equipment such as for example garbage treatment equipment mounted on a vehicle.

The control unit 30 controls the solenoid valve 15 for controlling the bypass air quantity in accordance with the routines illustrated by the following flow charts. The bypass control valve 14 is thus opened/closed to control the quantity of the intake mixture passing through the bypass passage 13.

Figure 9:
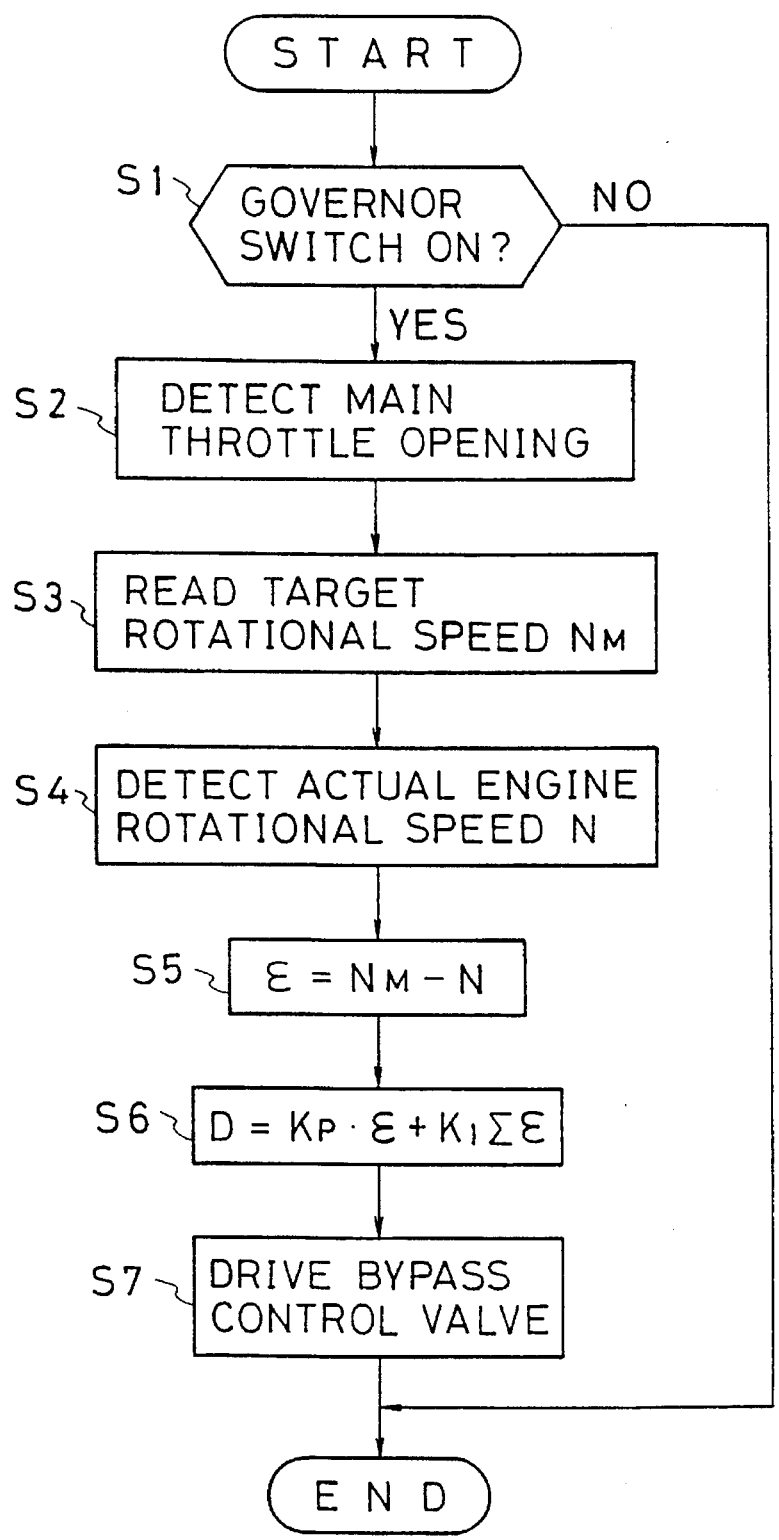
FIG. 9 is a flow chart illustrating the control contents in a first embodiment of the present invention.

As follows with reference to the flow chart of FIG. 9 is a description of the operation of the governor device according to a first embodiment.

In step 1, (with "step" denoted by S in the figures), it is judged if the governor switch 50 is ON. If ON, control proceeds to step 2 and subsequent steps, to operate the governor device and thus give stable operation of the PTO 55.

In step 2, the opening amount θ of the main throttle valve 3 is detected by the opening sensor 36.

Figure 10:
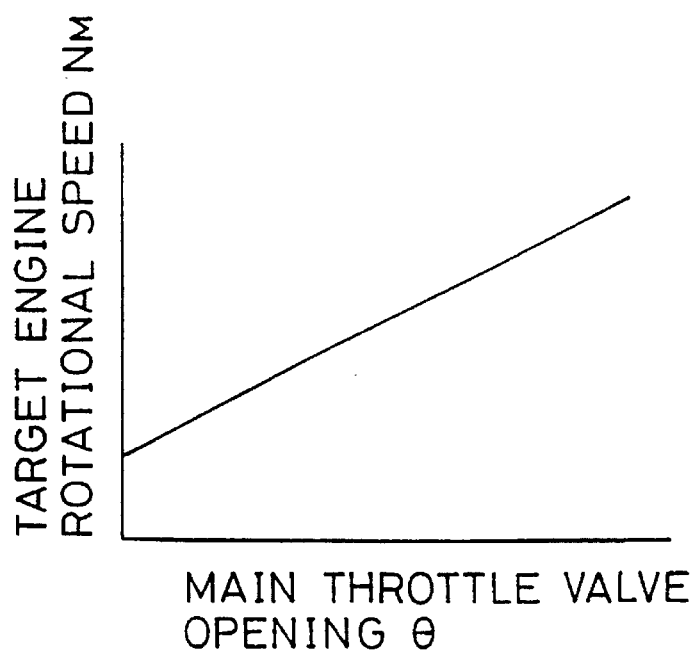
FIG. 10 is a characteristic diagram illustrating the characteristics of the target engine rotational speed in the first embodiment.

In step 3, a target rotational speed $N_M$ of the engine 1 as shown in FIG. 10, for driving the PTO 55 at the same speed in predetermined operating conditions, is read on the basis of the opening amount e of the main throttle valve 3 detected in step 2.

These steps have the function of a target rotational speed setting device.

In step 4, the actual engine rotational speed N is detected by the crank angle sensor 32.

In step 5, a difference s between the target rotational speed NM and the actual engine rotational speed N is determined from the following equation:

$$\epsilon = N_M - N$$

To drive the PTO 55 at the same speed in the predetermined operating conditions, the intake air passing through the intake manifold 2 must then be controlled by controlling the bypass control valve 14 to regulate the intake mixture amount passing through the bypass passage 13. Hence in step 6 a duty ratio D for applying to the solenoid valve 15 is computed from the following equation;

$$D = K_P \epsilon + K_1 \Sigma \epsilon$$

where KP is a proportional constant for when the duty control involves proportional integral control, and K1 is an integration constant, with duty control being carried out to quickly eliminate the beforementioned difference.

In step 7, the duty ratio D computed in step 6 is output to the solenoid valve 15 to control the opening/closing of the bypass control valve 14.

The bypass control valve 14 is provided in the bypass passage 13 which bypasses the mixer 5 and the main throttle valve 3, and increase/decrease control of the intake mixture passing through the intake manifold 2 is achieved by controlling the bypass control valve 14. In the mixer 5 CNG is drawn in from the slit 77 opening into the venturi 75 in correspondence with the intake air quantity, and mixed with the intake air to give a fixed lean air-fuel ratio. Consequently, when the intake air passing through the bypass passage 13 increases/decreases, the mixer 5 increases/decreases the CNG so as to maintain the beforementioned ratio. The CNG and intake air are thus increased/decreased so that the engine 1 output can be increased/decreased.

On the other hand, when judged in step 1 that the governor switch 50 is OFF, control returns as is without carrying out the above routine.

The intake mixture increase/decrease device thus comprises the bypass control valve 14 and the solenoid valve 15, with the control unit 30 functioning as an intake mixture control device.

Figure 11:
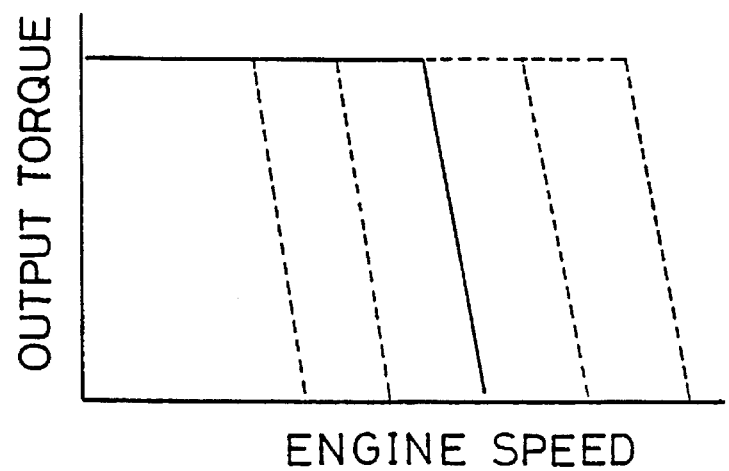
FIG. 11 is a characteristic diagram illustrating an operation in the first embodiment.

Consequently, as shown in FIG. 11, even with changes in the load on the PTO 55, the engine rotational speed N can be kept at the target rotational speed NM by increasing/decreasing the engine 1 output, thus giving good operability of the PTO 55.

Under normal operating conditions, that is to say when auxiliary power is not taken off, the bypass control valve 14 in the bypass passage 13 is closed by a signal from the control unit 30. Furthermore, an auxiliary fuel control valve 82 (to be described later) is also closed. Accordingly, a lean mixture produced by the mixer 5 is supplied to the engine 1. This results in lean combustion thus maintaining good exhaust composition and fuel consumption. In this situation, at times such as during engine idle, the idle control valve 18 opening is adjusted by the control unit 30 so that even with the opening of the main throttle valve 3 fixed, the mixture supply quantity can be slightly increased/decreased to keep a constant idle speed.

As follows is a description of a second embodiment according to the present invention. Since the overall system structure of the second embodiment is similar to that of the first embodiment, then reference is made to FIG. 6 and FIG. 7 and description is omitted.

Figure 12:
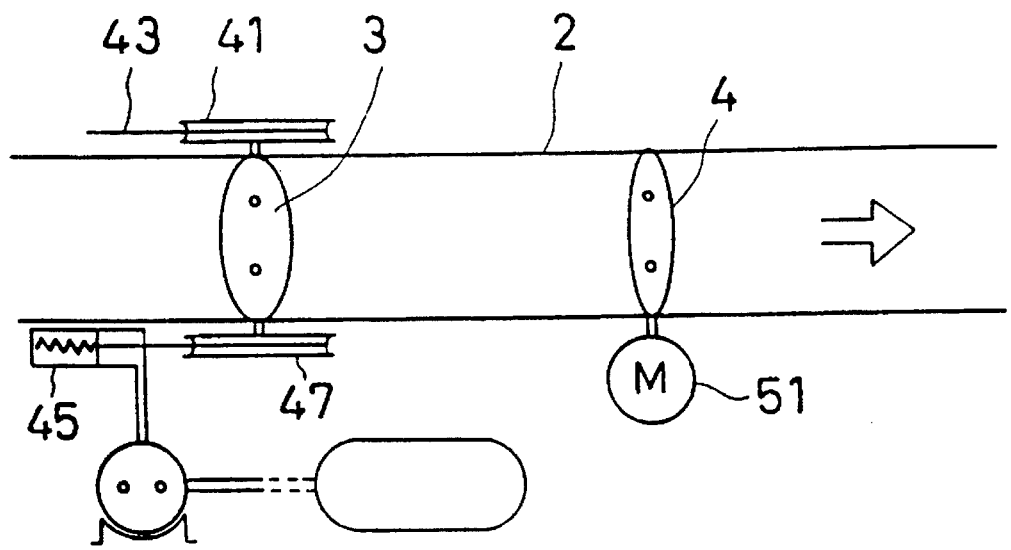
FIG. 12 is a schematic diagram of essential parts of a second embodiment.

With the construction of the second embodiment as shown in FIG. 12, to a rotating shaft of the main throttle valve 3 are fitted an accelerator drum 41 linked to an accelerator pedal by way of an accelerator cable 43, and an actuator drum 47 which is rotated by an actuator 45 of an air cylinder and the like. The construction is thus such that the main throttle valve 3 can be operated by a driver, and can also be rotated by the actuator 45 controlled by the control unit 30.

The construction is also such that the sub-throttle valve 4 is rotated for example by a motor 51, which is also controlled by the control unit 30.

In the above mentioned first embodiment, construction is such that the bypass control valve 14 is opened/closed by the control unit 30 to thus control the intake mixture quantity passing through the bypass passage 13. In the second embodiment however, the control unit 30 controls the opening/closing of the sub-throttle valve 4 in accordance with the routine illustrated by the following flow chart, to increase/decrease the intake mixture passing through the intake manifold 2.

The intake mixture increase/decrease device thus comprises the sub-throttle valve 4, with the control unit 30 functioning as a sub-throttle valve control) device.

Figure 13:
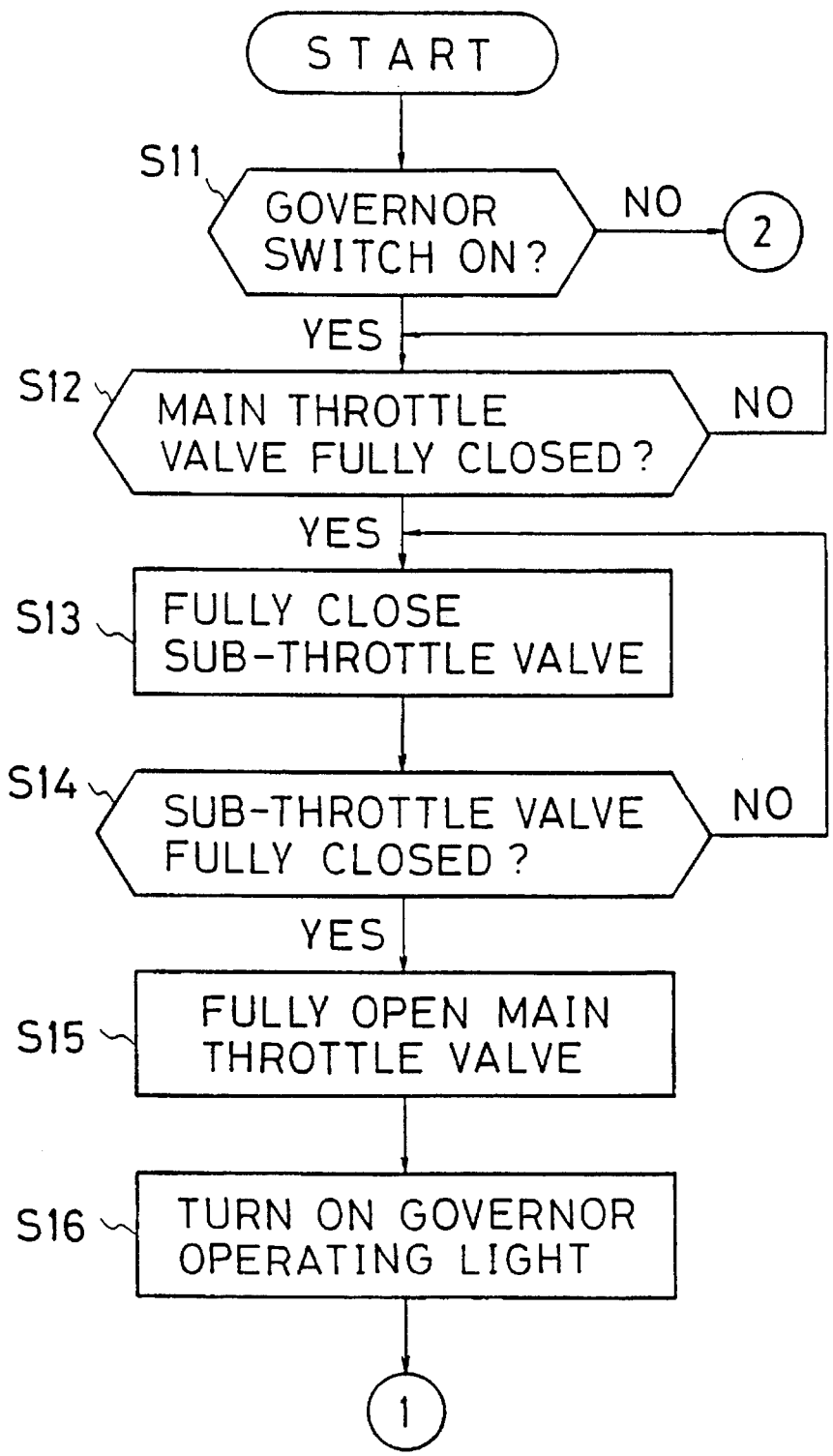
FIG. 13 is a flow chart illustrating the control contents in the second embodiment.
Figure 14:
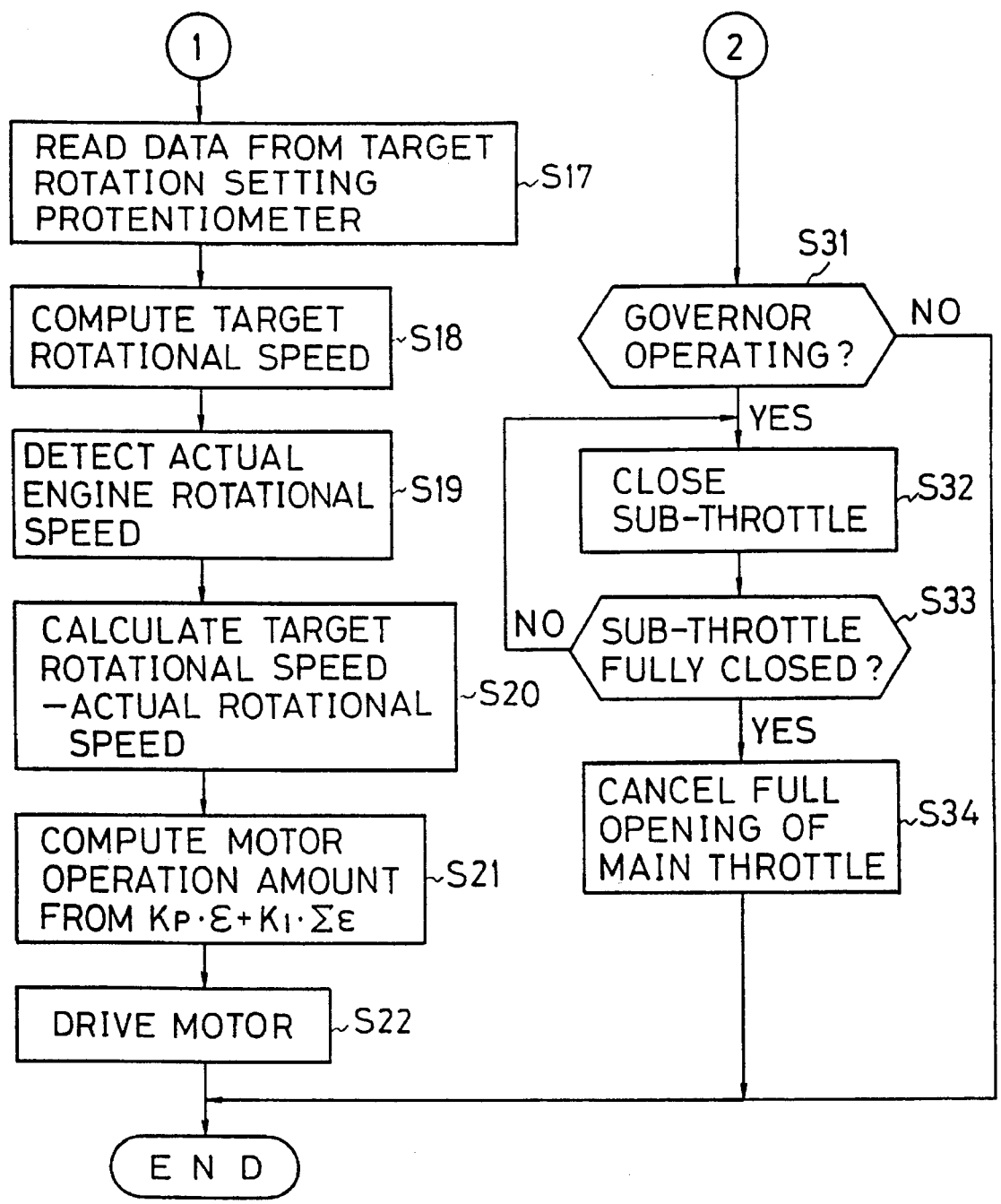
FIG. 14 is a continuation flow chart illustrating the control contents in the second embodiment.

As follows with reference to the flow chart of FIG. 13 and FIG. 14 is a description of the operation of the governor device according to the second embodiment.

In step 11, it is judged if the governor switch 50 is ON. If ON, control proceeds to step 12 and subsequent steps, to operate the governor device and thus give stable operation of the PTO 55.

In step 12, it is judged if the main throttle valve 3 is fully closed to thus verify that the vehicle is in a non running condition. When found to be fully closed, control proceeds to step 13.

In steps 13 and 14, the motor 51 is run until the sub-throttle valve 4 is fully closed.

After verifying in step 14 that the sub-throttle valve 4 is fully closed, control proceeds to step 15 where the main throttle valve 3 is fully opened. Governor operation with the sub-throttle valve 4 then becomes possible. That is to say, the intake air passing through the intake manifold 2 can be controlled with the sub-throttle valve 4 alone. Control then proceeds to step 16 to turn on the governor operating light.

In step 17, the engine 1 rotational speed Ns for the predetermined operating conditions of the PTO 55 is read from a rotational speed potentiometer (not shown) incorporated in the PTO device 55.

In step 18, based on the rotational speed Ns of the engine 1 read in step 17, a target rotational speed NM Of the engine 1 to drive the PTO 55 the same speed in the predetermined operating conditions is set.

These steps have the function of a target rotational speed setting device.

In step 19, the actual engine rotational speed N is detected by the crank angle sensor 32.

In step 20, a difference $\epsilon$ between the target rotational speed NM and the actual engine rotational speed N is determined from the following equation:

$$\epsilon = N_M - N$$

To drive the PTO 55 at the same speed in the predetermined operating conditions, the intake air passing through the intake manifold 2 must be controlled by the sub-throttle valve 4 alone. Hence in step 21 a duty ratio D for applying to the motor 51 is computed from the following equation;

$$D = K_P \epsilon + K_1 \Sigma_\epsilon$$

where $K_P$ is a proportional constant for when the duty control involves proportional integral control, and $K_1$ is an integration constant, with duty control being carried out to quickly eliminate the beforementioned difference.

In step 22, the duty ratio D computed in step 21 is output to the motor 51 to control the opening of the sub-throttle valve 4 to a predetermined opening.

The sub-throttle valve 4 is arranged in series with the main throttle valve 3 linked to the accelerator pedal, and increase/decrease control of the intake mixture passing through the intake manifold 2 is achieved by controlling the sub-throttle valve 4. In the mixer 5 CNG is drawn in from the slit 77 opening into the venturi 75 in correspondence with the intake air quantity, and mixed with the intake air to give a fixed lean air-fuel ratio. Consequently, when the intake mixture passing through the intake manifold 2 increases/decreases, the mixer 5 increases/decreases the CNG so as to maintain the beforementioned ratio. The CNG and intake air are thus increased/decreased so that the engine 1 output can be increased/decreased.

Consequently, as shown in FIG. 11, even with changes in the load on the PTO 55, the engine rotational speed N can be kept at the target rotational speed NM by increasing/decreasing the engine 1 output, thus giving good operability of the PTO 55.

On the other hand, when judged in step 11 that the governor switch 50 is OFF, control proceeds on to step 31 and subsequent steps.

In step 31, it is determined if the governor is presently operating, by judgement involving for example checking the governor operating light. If judged to be operating, control proceeds to step 32.

In steps 32 and 33, the motor 51 is run until the sub-throttle valve 4 is fully closed.

After verifying in step 33 that the sub-throttle valve 4 is fully closed, control proceeds to step 34 where full open control of the main throttle valve 3 is cancelled. That is to say, control of the intake air passing through the intake manifold 2 with the sub-throttle valve 4 alone is terminated, and control returns to normal intake control with the main throttle valve 3.

As follows is a description of a third embodiment of the present invention. Since the overall system structure of the third embodiment is similar to that of the first embodiment, then reference is made to FIG. 6 and FIG. 7 and description is omitted.

With the construction of the third embodiment as shown in FIG. 6 and FIG. 7, an auxiliary fuel path 81 is provided which branches from the fuel flow path 79 and is connected to the slit 77. This auxiliary fuel path 81 is fitted with a fuel control valve 82 comprising a solenoid valve for opening/closing the auxiliary fuel path 81. When the fuel control valve 82 is open, the gas fuel drawn from the venturi 75 is increased in quantity so that the air-fuel mixture produced by the mixer 5 is enriched.

The auxiliary gas fuel supply device thus comprises the auxiliary fuel path 81 and the fuel control valve 82.

In the above mentioned first embodiment, construction is such that the bypass control valve 14 is opened/closed by the control unit 30 to thus control the intake mixture quantity passing through the bypass passage 13. In the third embodiment however, the control unit 30 controls the opening/closing of the bypass control valve 14 in accordance with the routine illustrated by the following flow chart, and also controls the opening/closing of the fuel control valve 82.

Figure 15:
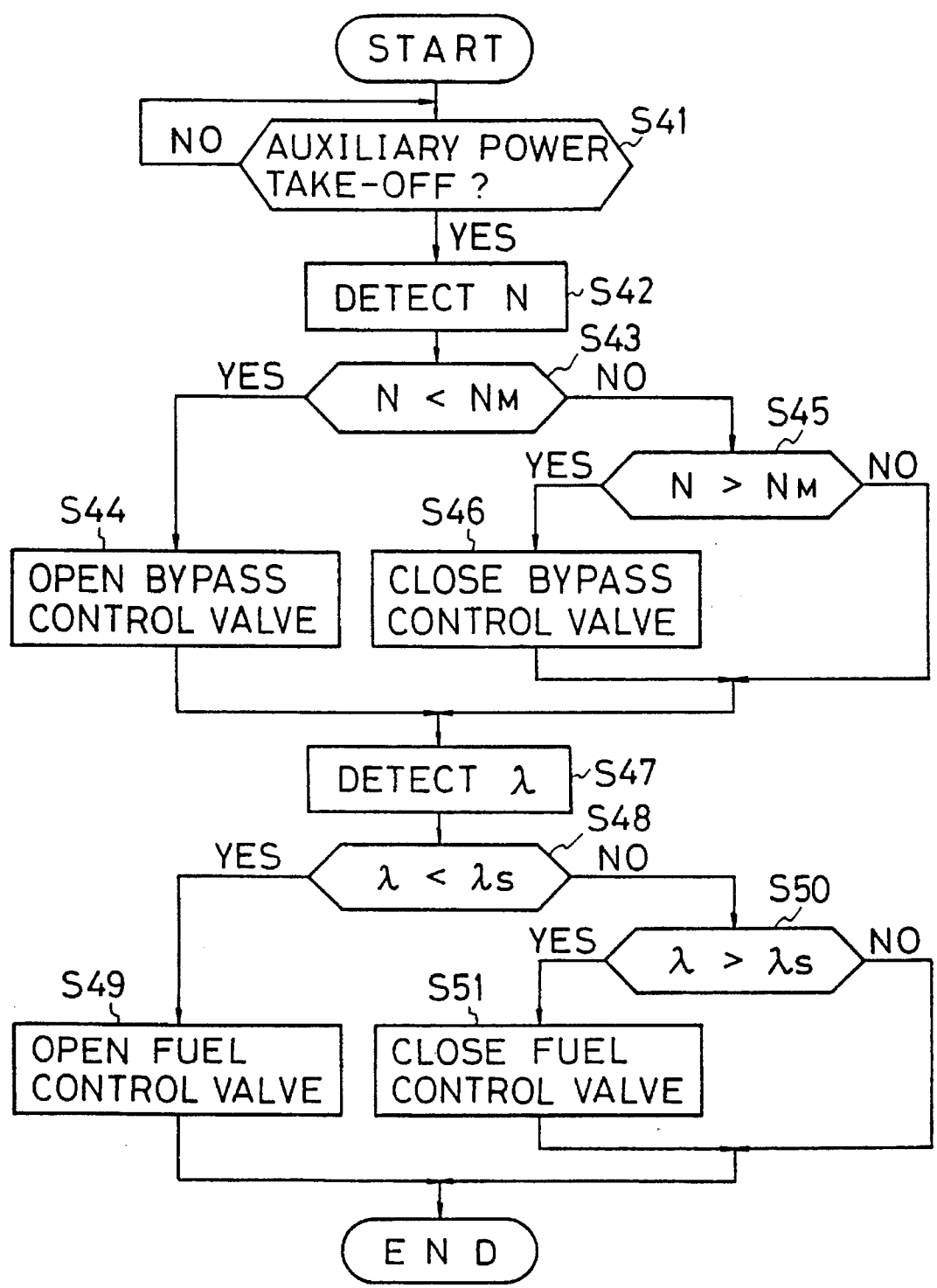
FIG. 15 is a flow chart illustrating the control contents in a third embodiment.

As follows with reference to the flow chart of FIG. 15 is a description of the operation of the governor device according to the third embodiment.

At first in step 41, judgement of the output of the governor switch 50 is made to determine if auxiliary power take-off conditions exist to drive the PTO 55. If auxiliary power take-off conditions exist, control proceeds to step 42, and the actual engine rotational speed N is detected by the crank angle sensor 32.

Then in step 43 it is judged if the engine rotational speed N is higher or lower than the pre-set target rotational speed $N_M$. If the detected rotational speed N is lower, control proceeds to step 44 to open the bypass control valve 14. The bypass control valve 14 is opened by driving the solenoid valve 15. Alternatively, when the detected rotational speed N is not lower than the target rotational speed $N_M$, control moves to step 45 where comparison is again made with the target rotational speed $N_M$. When the detected rotational speed N is higher than this, then in step 46 the bypass control valve 14 is closed, while when not, that is to say when equal to $N_M$, conditions are maintained the same as before.

In this way, when the bypass passage 13 is open, the bypass flow quantity portion is added to the engine intake air quantity which is controlled by the opening of the main throttle valve 3, so that the intake air quantity is relatively increased. On the other hand, when the bypass passage 13 is closed, the intake air quantity is reduced.

Subsequently in step 47, the detected air-fuel ratio $\lambda$ from the exhaust sensor 34 is read, and in step 48, this detected air-fuel ratio 1 is compared with a set air-fuel ratio $\lambda s$ (a pre-set target air-fuel ratio) (where $\lambda$ is the inverse of an air excess ratio, and $\lambda s=1$ for the theoretical air-fuel ratio). When leaner than the set air-fuel ratio, control proceeds to step 49, where the fuel control valve 82 is opened so that the quantity of gas fuel drawn in from the venturi 75 is increased to thus enrich the air-fuel ratio produced by the mixer 5.

On the other hand, when in step 48 the air-fuel ratio is not leaner than the set air-fuel ratio, control proceeds to step 50 where comparison is again made with the set air-fuel ratio $\lambda s$. When richer, then in step 51 the fuel control valve 82 is closed, while when not, that is to say when equal to $\lambda s$, conditions are maintained the same as before.

In this way, the air-fuel ratio is kept at the set air-fuel ratio (target air-fuel ratio).

Accordingly, at the time of auxiliary power take-off, auxiliary fuel is supplied for the lean mixture produced in the mixer 5, and feedback control is carried out so that the air-fuel ratio becomes the set air-fuel ratio. In addition, when the engine rotational speed drops below the target value, the bypass passage 13 is opened so that the intake air quantity is relatively increased without opening the main throttle valve 3, to maintain the same rotational speed to meet the load change of the auxiliary power.

That is to say, the function of the auxiliary gas fuel supply intake mixture control device is provided by the control unit 30.

In particular with the third embodiment, since the intake air quantity is relatively increased by opening the bypass passage 13, and the mixture is changed to the set air-fuel ratio which is richer than the normal lean air-fuel ratio, then even if the load of the accessory equipment changes quite significantly, the change in rotational speed can be absorbed with a good response. That is to say, the change absorbing capacity is great so that it becomes possible to stably maintain a constant rotational speed. Consequently, good operability can be realized with stable drive of the accessory equipment.

As follows is a description of a fourth embodiment of the present invention. In the fourth embodiment there is no bypass passage 13. Moreover, the load change of the accessory equipment is met by enriching only the fuel at the time of auxiliary power take-off, without carrying out air-fuel ratio feedback control.

Figure 16:
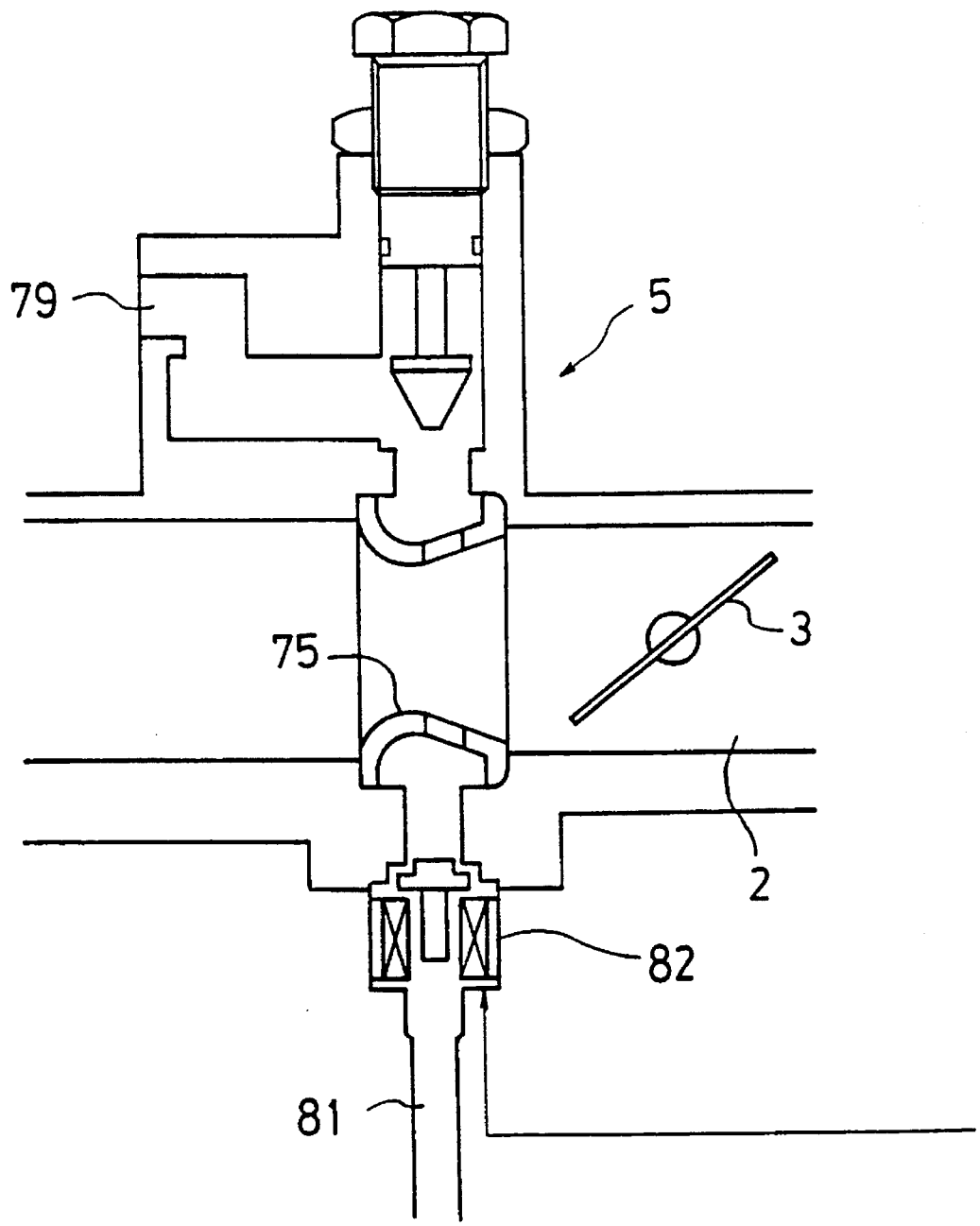
FIG. 16 is a schematic diagram of essential parts of a fourth embodiment.

With regards to the overall system structure of the fourth embodiment, since this is similar to that of the first embodiment, then reference is made to FIG. 6 and FIG. 7 and description is omitted. With the construction of the fourth embodiment, as shown in FIG. 16, an auxiliary fuel path 81 is provided which branches from the fuel flow path 79 and is connected to the slit 77. This auxiliary fuel path 81 is fitted with a fuel control valve 82 comprising a solenoid valve for opening/closing the auxiliary fuel path 81. The bypass control valve 14 and other components are omitted. At the time of auxiliary power take-off, the air-fuel ratio produced by the mixer 5 is enriched by controlling the opening of the fuel control valve 82 with the control unit 30, so the engine output is increased to thereby maintain the engine rotational speed at the target fixed rotational speed.

Figure 17:
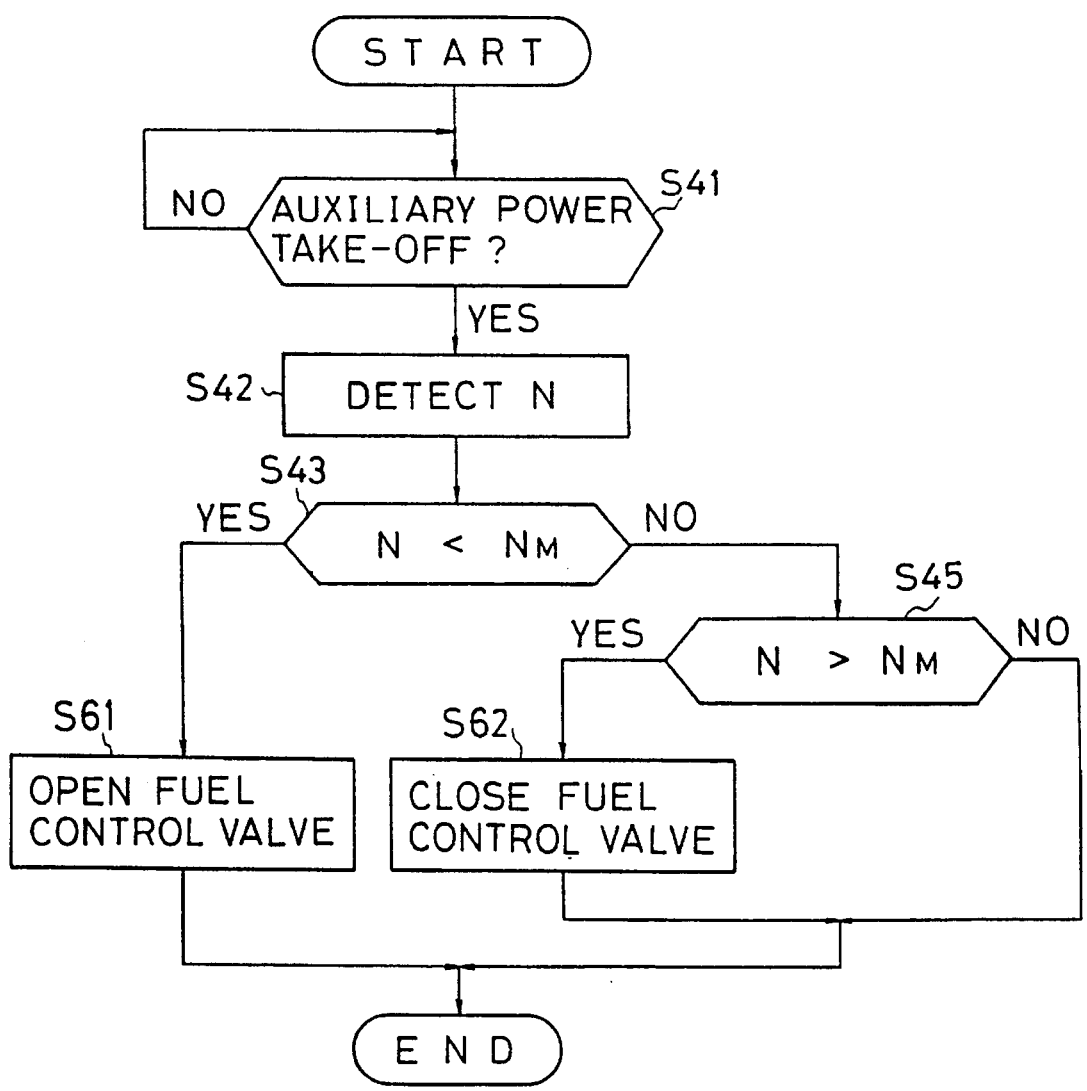
FIG. 17 is a flow chart illustrating the control contents in the fourth embodiment.

Referring now to the flow chart of FIG. 17, steps 41 to 43 are equivalent to those of the flow chart of FIG. 15. In these steps the engine rotational speed N is compared with the set rotational speed $N_M$. When the rotational speed N is less than the target rotational speed $N_M$, control proceeds to step 61 to open the fuel control valve 82. Alternatively, when the detected rotational speed N is not lower than the target rotational speed $N_M$, control moves to step 45 where comparison is again made with the target rotational speed $N_M$. When the detected rotational speed N is higher than this, then in step 62 the fuel control valve 82 is closed, while when not, that is to say when equal to $N_M$, conditions are maintained the same as before.

Accordingly, at the time of auxiliary power take-off, when the engine rotational speed drops below the target value, the fuel control valve 82 is opened, and the air-fuel ratio of the mixture produced by the mixer 5 is enriched relative to the lean air-fuel ratio up until then. As a result, the engine output is increased, and engine rotational speed increases without adjustment of the opening of the main throttle valve 3. If the rotational speed increases above the target rotational speed the fuel control valve 82 is closed, so that the air-fuel ratio becomes lean and the rotational speed drops. In this way the engine rotational speed can be maintained at the same speed even when load changes occur in the auxiliary power.

That is to say, the function of the auxiliary gas fuel control device is provided by the control unit 30.

In particular with the fourth embodiment, since the load change of the accessory equipment is absorbed without changing the intake air quantity, by changing the mixture to a set air-fuel ratio which is richer than the normal lean air-fuel ratio, the load change absorption capacity is low compared to that of the third embodiment. However if used in the situation where the load of the accessory equipment is not very large, a sufficient performance can be demonstrated. Moreover, simple and low cost construction is realized.

The present invention as described above, has a construction which includes a mixing device for mixing the fuel and intake air in a predetermined ratio, an auxiliary power take-off device for taking off a portion of the engine output as driving force for vehicle mounted accessory equipment which requires constant speed rotation with changes in load, an intake mixture increase/decrease device for increasing/decreasing the intake mixture passing through the intake mixture passage, a target rotational speed setting device for setting a target rotational speed for the auxiliary power take-off device, and an intake mixture control device for controlling the intake mixture increase/decrease device so as to give the target rotational speed at the time of auxiliary power take-off. Consequently, even with changes in the load on the auxiliary power take-off device, the engine rotational speed can be maintained at the beforementioned target rotational speed by increasing/decreasing the engine output, resulting in good operability of the auxiliary power take-off device.

Moreover, the same effect can be obtained if the intake mixture increase/decrease device comprises a bypass path open/close device provided in a bypass passage which bypasses the before mentioned mixing device, for controlling the intake air quantity passing through the bypass passage, and the intake mixture control device is a bypass passage control device for controlling the bypass passage open/close device so as to give the target rotational speed. The same effect can also be obtained if a main throttle valve linked to an accelerator pedal is positioned in the intake mixture passage, and the intake mixture increase/decrease device comprises a sub-throttle valve provided in the intake mixture passage in series with the main throttle valve, and the intake mixture control device is a sub-throttle valve control device for controlling the sub-throttle valve so as to give the target rotational speed.

Furthermore, with an internal combustion engine governor device comprising a mixing device for mixing natural gas and intake air in a predetermined ratio, and an auxiliary power take-off device for taking off a portion of the engine output as driving force for vehicle mounted accessory equipment which requires constant speed rotation with changes in load, the construction comprises an intake mixture increase/decrease device for increasing/decreasing the intake mixture passing through the intake mixture passage, a target rotational speed setting device for setting a target rotational speed for the auxiliary power take-off device, an auxiliary gas fuel supply device for supplying auxiliary gas fuel, an air-fuel ratio detection device for detecting the air-fuel ratio of the engine intake mixture, and an auxiliary gas fuel intake mixture control device for controlling the supply quantity of auxiliary gas fuel so that the detected air-fuel ratio at the time of auxiliary power take-off is constant, and for controlling the intake mixture increase/decrease device so as to give the target rotational speed. As a result, at the time of auxiliary power takeoff, the engine intake air quantity and fuel supply quantity are increased, so that even if the load on the auxiliary power take-off device changes, the engine rotational speed does not deviate greatly from the target rotational speed. Therefore, the target rotational speed is maintained resulting in good operability of the auxiliary power take-off device.

Moreover, with an internal combustion engine governor device comprising a mixing device for mixing natural gas and intake air in a predetermined ratio, and an auxiliary power take-off device for taking off a portion of the engine output as driving force for vehicle mounted accessory equipment which requires constant speed rotation with changes in load, the construction comprises, a target rotational speed setting device for setting a target rotational speed for the auxiliary power take-off device, an auxiliary gas fuel supply device for supplying auxiliary gas fuel, and an auxiliary gas fuel intake mixture control device for controlling the supply quantity of auxiliary gas fuel so as to give the target rotational speed at the time of the auxiliary power take-off. As a result, the engine rotational speed does not deviate greatly from the target rotational speed even with changes in the load on the auxiliary power take-off device, and also operation can be achieved at low cost.

Although the present invention has been described and illustrated in detail, it should be clearly understood that the same is by way of illustration and example only and is not to be taken by way of limitation, the spirit and scope of the present invention being limited only be the terms of the appended claims.

What is claimed is:

1. A governor device for an internal combustion engine, comprising:

mixing means for mixing fuel and intake air in a predetermined ratio;

auxiliary power take-off means for taking off a portion of the engine output as power for driving vehicle mounted accessory equipment which requires constant speed rotation despite changes in load;

intake mixture increase/decrease means for increasing/decreasing an intake mixture passing through an intake mixture passage;

target rotational speed setting means for setting a target rotational speed for the auxiliary power take-off means; and intake mixture control means for controlling the intake mixture increase/decrease means so as to give the target rotational speed at the time of auxiliary power takeoff, wherein a main throttle valve linked to an accelerator pedal is positioned in the intake mixture passage, and said intake mixture increase/decrease means comprises a sub-throttle valve provided in the intake mixture passage in series with the main throttle valve, and said intake mixture control means is a subthrottle valve control means for controlling the sub-throttle valve so as to give the target rotational speed.

2. A governor device for an internal combustion engine as claimed in claim 1, further comprising;

auxiliary gas fuel supply means for supplying auxiliary gas fuel, air-fuel ratio detection means for detecting the air-fuel ratio of the engine intake mixture, and means for controlling the supply quantity of auxiliary gas fuel so that the detected air-fuel ratio during auxiliary power take-off is constant, wherein the internal combustion engine is one which uses high pressure natural gas fuel.

3. A governor device for an internal combustion engine as claimed in claim 2, wherein:

said intake mixture increase/decrease means comprises a bypass passage open/close means provided in a bypass passage which bypasses the mixing means, for controlling the intake air quantity passing through the bypass passage, and said auxiliary gas fuel intake mixture control means comprises a bypass passage control means for controlling the bypass passage open/close means so as to give the target rotational speed during auxiliary power take-off.

4. A governor device for an internal combustion engine as claimed in claim 1, further comprising:

auxiliary gas fuel supply means for supplying auxiliary gas fuel, and means for controlling the supply quantity of auxiliary gas fuel so as to give the target rotational speed during auxiliary power take off, wherein the internal combustion engine is one which uses high pressure natural gas fuel.

5. A governor device for an internal combustion engine governor device comprising; mixing means for mixing natural gas and intake air in a predetermined ratio, auxiliary power take-off means for taking off a portion of the engine output as driving force for vehicle mounted accessory equipment which requires constant speed rotation with changes in load, target rotational speed setting means for setting a target rotational speed for the auxiliary power take-off means, auxiliary gas fuel supply means for supplying auxiliary gas fuel, and auxiliary gas fuel control means for controlling the supply quantity of auxiliary gas fuel so as to give the target rotational speed during auxiliary power takeoff.

* * * * *